United States Patent Office 3,068,244
Patented Dec. 11, 1962

3,068,244
11,12-SECOPREGNANE-12-OXY-11-OIC(11-12) LACTONES
John A. Zderic, Mexico City, Mexico, assignor, by mesne assignments, to Syntex Corporation, a corporation of Panama
No Drawing. Filed Apr. 19, 1961, Ser. No. 104,002
11 Claims. (Cl. 260—343.2)

The present invention relates to novel cyclopentanophenanthrene compounds and to a process for the production thereof.

More particularly the present invention relates to the preparation of 11,12-seco-12-ol-11-oic (11-12)lactone derivatives of $\Delta^{1,4}$-pregnadiene and esters thereof as well as to the preparation of novel intermediates.

The novel compounds of the present invention which have glycogenic, thymolytic, catabolic, anti-estrogenic, anti-androgenic and anti-gonadotrophic activities and are therefore useful therapeutic agents usable in a known manner, are represented by the following formula:

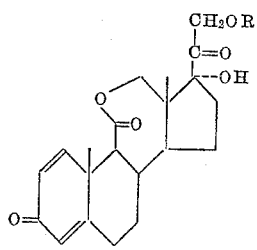

In the above formula R represents hydrogen or the acyl radical of a hydrocarbon carboxylic acid of less than 12 carbons, saturated or unsaturated, of straight, branched, cyclic or cyclic-aliphatic chain or aromatic and may be substituted by functional groups such as hydroxy, acyloxy, alkoxy, amino, nitro or halogen. Typical ester groups are the acetate, propionate, butyrate, benzoate, cyclopentylpropionate, aminoacetate, β-chloropropionate, hemisuccinate, enanthate, caproate, trimethylacetate, methoxyacetate, phenoxyacetate and phenylpropionate. The acyl radical is preferably the acetyl or a lower alkanoyl radical.

The novel compounds of the present invention may be prepared by a process illustrated by the following equation:

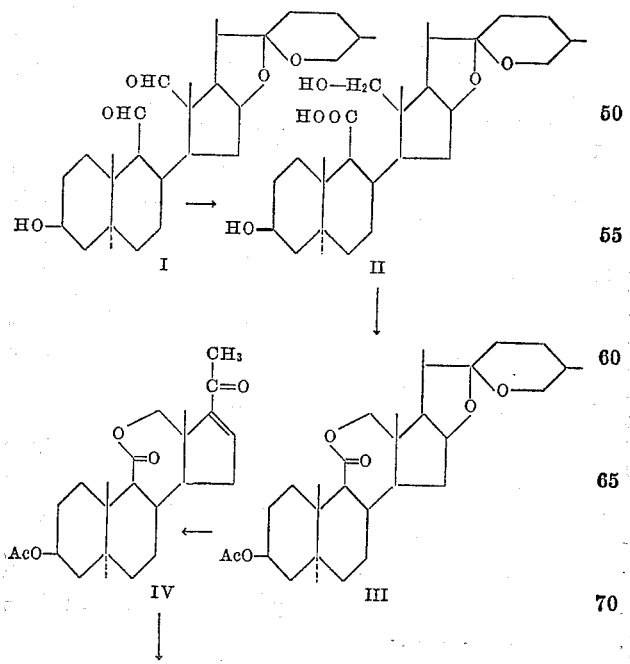

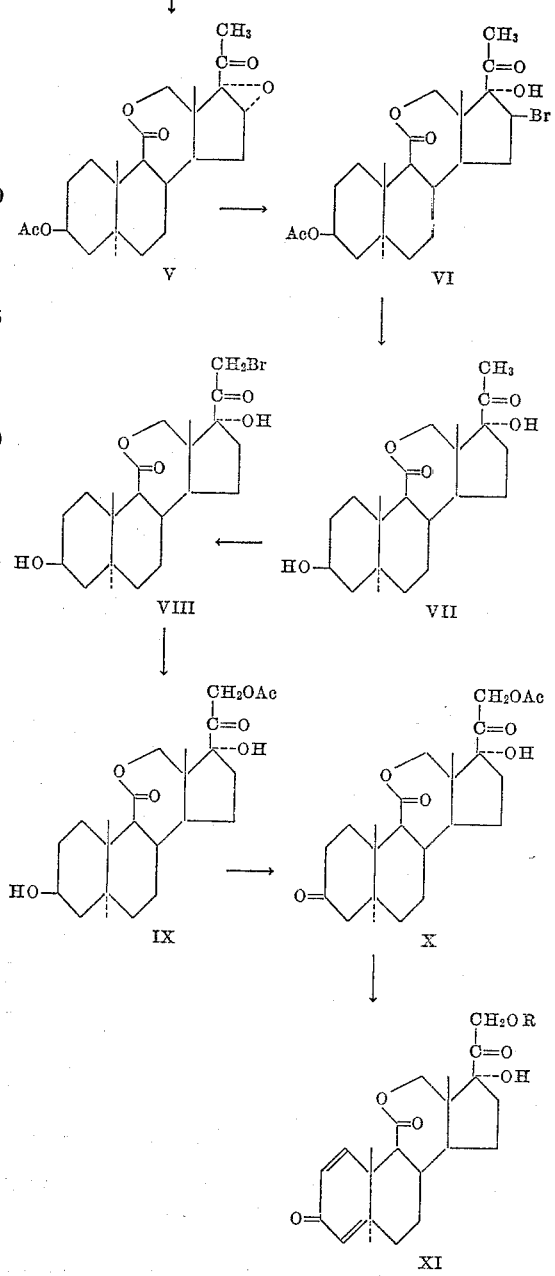

In the above equation R has the same meaning as set forth above, and Ac represents the acetyl radical.

In practicing the process outlined above, the starting compound 11,12-seco-22-isoallospirostan-3β-ol-11,12-dial (I) is prepared by treating 22-isoallospirostan-3β,11β,12β-triol (Djerassi, Martinez & Rosenkranz, J. Org. Chem. 16, 1278 (1951) with lead tetraacetate in an inert solvent such as benzene.

The dialdehyde is then reacted with an alkali metal hydroxide such as postassium hydroxide in a lower alkyl alcohol as for example ethanol, at reflux temperature for a period of time at the order of one hour, to form 11,12-seco-22-isoallospirostan-3β,12-diol-11-oic acid (II). Upon treatment of this compound under the conditions conventionally used for acetylation, there also occurs the lactonization of the 11-carbonyl group with the 12-hydroxyl group thus resulting in the 3-acetate of 11,12-seco-22-isoallospirostan-3β,12-diol-11-oic (11-12)lactone (III). The spiroketal side chain is then degradated by a conventional series of steps. The foregoing compound is first treated with acetic anhydride for a period of time of the order of 8 hours at a temperature of approximately 200° C. The resulting crude product is then oxidized preferably with chromium trioxide, hydrolyzed with an alkali metal hydroxide such as sodium hydroxide and finally acetylated by conventional procedures, thus furnishing 11,12-seco-$\Delta^{16}$ - allopregnene-3$\beta$,12-diol-20-one - 11 - oic (11-12)lactone-3$\beta$-acetate (IV). Epoxidation of this last compound takes place when it is treated with an oxidizing agent such as t-butyl hydroperoxide in the presence of an inert solvent such as benzene and a strong organic base thus giving 16$\alpha$,17$\alpha$ - oxido-11,12-secoallopregnane-3$\beta$,12-diol-20-one-11-oic (11-12)-lactone-3$\beta$-acetate (V). The corresponding bromohydrin (VI) is formed by treatment with hydrogen bromide. Upon debromination of this compound by reflux with Raney nickel in a lower alkanol such as methanol, for a period of time of the order of 2 hours and subsequent hydrolysis of the 3-acetoxy group by treatment with a suitable acid, such as hydrogen chloride dissolved for example in methanol, for approximately one hour and at room temperature, there is obtained 11,12-secoallopregnane-3$\beta$,12,17$\alpha$-triol-20-one-11-oic (11-12)-lactone (VII).

This last compound is treated with 1.1 mol. equivalents of bromine in a suitable solvent as for example chloroform in presence of hydrogen bromide, thus furnishing the corresponding 21-bromo - 11,12 - secoallopregnane-3$\beta$,12,17$\alpha$-triol-20-one-11-oic (11-12)-lactone (VIII).

Upon refluxing the foregoing compound in a suitable solvent such as acetone with an alkali metal iodide as for example sodium iodide and preferably potassium acetate for a period of time of the order of 10 days, there is obtained 11,12 - secoallopregnane-3$\beta$,12,17$\alpha$,21-tetrol-20-one-11-oic (11-12)lactone-21-acetate (IX). The foregoing compound is treated with an oxidizing agent preferably chromium trioxide (Jones reagent) thus affording 11,12-secoallopregnane-12,17$\alpha$,21-triol-3,20-dione - 11 - oic (11-12)-lactone-21-acetate (X).

This compound is dehydrogenated as for example with 2,3-dichloro-5,6-dicyano-p-benzoquinone by refluxing it in a suitable solvent such as dioxane, for a period of time of the order of 20 hours, furnishing 11,12-seco-$\Delta^{1,4}$-pregnadiene-12,17$\alpha$,21-triol-3,20-dione - 11 - oic (11-12)-lactone-21-acetate (XI; R=Ac).

The last named compound is hydrolyzed with a methanolic solution of hydrochloric acid and may be reesterified conventionally by treatment with an acylating agent such as propionic acid anhydride thus furnishing the corresponding ester, in this case the 21-propionate of 11,12-seco-$\Delta^{1,4}$-pregnadiene-12,17$\alpha$,21 - triol - 3,20-dione-11-oic (11-12)lactone.

The following examples serve to illustrate but are not intended to limit the present invention:

*Example I*

To a mixture of 8.1 g. of 22-isoallospirostane-3$\beta$,11$\beta$,12$\beta$-triol (C. Djerassi, H. Martinez & G. Rosenkranz, J. Org. Chem. 16, 1278 (1951)), 140 cc. of glacial acetic acid and 210 ml. of thiophene-free benzene, 12.1 g. of lead tetraacetate were added and the mixture was stirred at room temperature for 5 minutes. 200 cc. of water containing 100 g. of sodium acetate and 4 g. of sodium iodide were added, the color was discharged by the addition of 80 ml. of saturated aqueous sodium thiosulfate solution and the product extracted twice, using each time 200 ml. of ethyl acetate. The pooled extracts were washed with aqueous sodium bicarbonate and water, dried over anhydrous sodium sulfate and evaporated to dryness. The residue was crystallized from methanol-water affording 11,12-seco-22-isoallospirostan-3$\beta$-ol-11,12-dial.

5.3 g. of the above compound in 75 cc. of ethanol was refluxed with 5 g. of potassium hydroxide for one hour. The mixture was poured into water and extracted with ethyl acetate. The inorganic layer, which contained the acidic fraction, was acidified with hydrochloric acid and extracted with methylene chloride. The extract was washed with water, dried over sodium sulfate and evaporated to dryness. Recrystallization from ethyl acetate afforded 3.1 g. of 11,12-seco-22-isoallospirostane-3$\beta$,12-diol-11-oic acid. This compound had a melting point of 274–6° C.; $[\alpha]_D$ −83°.

3 g. of this compound in 25 cc. of pyridine were treated with 6 cc. of acetic anhydride. The resulting mixture was kept overnight at room temperature, then poured into water and extracted with methylene chloride. The extract was washed successively with diluted hydrochloric acid, and water to neutral and evaporated to dryness. Crystallization from ethyl acetate-hexane afforded the 3$\beta$-acetate of 11,12-seco-22-isoallospirostane-3$\beta$,12-diol-11-oic (11-12)lactone. This compound had a melting point of 293–5° C.; $[\alpha]_D$ −92° (CHCl$_3$).

3 g. of the above product were heated for eight hours with 25 cc. of acetic anhydride in a sealed tube at 200° C. After cooling, the reaction mixture was poured into water and extracted with methylene chloride. After evaporation the solid residue was dissolved in a mixture of 45 cc. of acetic acid and 38 cc. of ethylene dichloride and treated dropwise with 1.5 g. of chromium trioxide in 25 cc. of 90% acetic acid with constant stirring. The stirring was continued for 2 hours at room temperature. Addition of water, extraction with methylene chloride and evaporation of the extract afforded a crude product.

This product was dissolved in 30 cc. of acetone and treated with 1.5 g. of sodium hydroxide in 6 cc. of water. The mixture was refluxed for one half hour, poured into water and extracted with methylene chloride.

Evaporation of the solvent afforded a product which was treated with 6 cc. of acetic anhydride and 25 cc. of pyridine, following the technique described above. Crystallization from ethyl acetate-hexane furnished 11-12-seco - $\Delta^{16}$ - allopregnene - 3$\beta$,12 - diol - 20 - one - 11 - oic (11-12)lactone-3$\beta$-acetate with a melting point of 220–22° C.; $[\alpha]_D$ +37° (CHCl$_3$), $\lambda$max. 226 m$\mu$ log $\epsilon$=3.88.

*Example II*

2 g. of the above product in 12 cc. of benzene were treated with 1.2 cc. of t-butyl hydroperoxide and 1 cc. of benzyl trimethylammonium hydroxide (40%, in water). The reaction mixture was kept overnight at room temperature. After addition of water, extraction with methylene chloride and evaporation of the extract, there was obtained a crude product. Recrystallization from acetone-hexane afforded 16$\alpha$,17$\alpha$-oxido 11,12-seco-allopregnane-3$\beta$,12-diol-20-one - 11 - oic (11-12)lactone-3$\beta$-acetate with a melting point of 281–82° C.; $[\alpha]_D$ ±0° (CHCl$_3$).

*Example III*

630 mg. of the foregoing compound in 10 cc. of acetic acid were treated with 1.2 cc. of a saturated solution of hydrogen bromide in acetic acid. The reaction mixture was kept at room temperature for 1.15 hours. It was then poured into water and the formed precipitate was collected. Crystallization from acetone-hexane yielded 700 mg. of 16$\beta$-bromo-11,12-secoallopregnane-3$\beta$,12,17$\alpha$-triol-20-one-11-oic (11-12)lactone-3$\beta$-acetate, with a melting point of 205–6° C.; $[\alpha]_D$ −46.5° (CHCl$_3$).

*Example IV*

700 mg. of the above bromohydrin were refluxed for 2 hours with 8 g. of Raney nickel in 120 cc. of methanol. The nickel was removed by filtration, the filtrate was evaporated to dryness and the residue crystallized from methanol thus furnishing 11,12-secoallopregnane-3$\beta$,12,17$\alpha$-triol-20-one-11-oic (11-12)lactone-3$\beta$-acetate. This compound had a melting point of 194–5° C.; $[\alpha]_D$ −77.1° (CHCl$_3$).

Example V

The 3-acetoxy group of the above compound was hydrolyzed by treating a solution of 500 mg. of the compound with 6 cc. of methanol saturated with hydrogen chloride, at room temperature for 1 hour. Subsequent dilution with water and collection of the precipitate by filtration, finally water-washing, drying and recrystallization from methanol yielded 11,12-secoallopregnane-3β,12,17α-triol-20-one-11-oic (11-12)lactone with a melting point 281–82° C.; $[\alpha]_D$ —70.5° ($CHCl_3$).

Example VI

A solution of 250 mg. of the above compound in 25 cc. of chloroform was treated with 1.1 mol equivalents of bromine dissolved in 50 cc. of chloroform adding previously a drop of hydrogen bromide acetic solution. The operation was conducted with stirring and at 15° C. The reaction mixture was washed with 5% sodium bicarbonate aqueous solution, water, and evaporated to dryness under reduced pressure. Recrystallization from acetone-hexane afforded 21-bromo-11,12-secoallopregnane-3β,12,17α-triol-20-one-11-oic (11-12)lactone. This compound had a melting point of 248–50° C.

Example VII 1 g. of the foregoing compound was dissolved in 300 cc. of anhydrous acetone and was refluxed for 10 days with 1 g. of sodium iodide and 5 g. of anhydrous potassium acetate. The solvent was evaporated and the residue was partially dissolved in ice water. The insoluble portion was collected by filtration, washed with water, dried under vacuum and recrystallized from ethyl acetate-hexane, thus furnishing 11,12-secoallopregnane-3β,12,17α,21-tetrol-20-one-11-oic (11-12)lactone-21-acetate.

Example VIII 420 mg. of the above compound in 4 cc. of acetone was treated with 0.5 cc. of 8 N chromic acid solution in diluted sulfuric acid. The mixture was stirred for 10 minutes at room temperature and poured into water. The precipitate was collected by filtration, washed with water and recrystallized from ethanol affording 11,12-secoallopregnane - 12,17α,21-triol-3,20-dione-11-oic (11-12)lactone-21-acetate with a melting point of 247–51° C.; $[\alpha]_D$ —29.6° ($CHCl_3$) λ max. 280–90 mμ, log $\epsilon$=1.85.

Example IX 1 g. of the foregoing compound in 20 cc. of dioxane was refluxed with 1.5 g. of 2,3-dichloro-5,6-dicyano-p-benzoquinone for 20 hours. The resulting mixture was evaporated to dryness under vacuum. Neutral alumina chromatography and recrystallization from ethanol afforded 11,12-seco-$\Delta^{1,4}$-pregnadiene-12,17α,21-triol-3,20-dione-11-oic (11-12)lactone-21-acetate. This compound had a melting point of 251–3° C.; $[\alpha]_D$ —12.6°

$\lambda_{max.}^{EtOH}$ 238–40 log $\Sigma$=4.16

Example X 750 mg. of the above compound were treated with a saturated hydrogen chloride methanolic solution such as described in Example V, thus undergoing the hydrolysis of the 21-acetoxy group, furnishing 11,12-seco-$\Delta^{1,4}$-pregnadiene-12,17α,21-triol-3,20-dione-11-oic (11-12)lactone.

This compound was acylated using exactly the same conditions described in Example I, except that the acetic anhydride was substituted by propionic anhydride thus yielding the 21-propionate of 11,12-seco-$\Delta^{1,4}$-pregnadiene-12,17α,21-triol-3,20-dione - 11 - oic (11-12)lactone. In the same way using the corresponding anhydride there was conventionally prepared the 21-cyclopentylpropionate, benzoate, caproate and enanthate.

I claim:

1. A compound of the following formula:

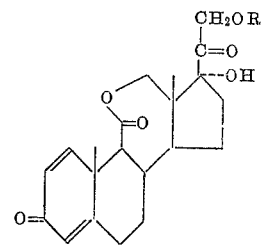

wherein R is selected from the group consisting of hydrogen and hydrocarbon carboxylic acyl of less than 12 carbon atoms.

2. 11,12 - seco- $\Delta^{1,4}$ - pregnadiene - 12,17α,21 - triol-3,20-dione-11-oic (11-12)lactone.

3. The 21-acetate of 11,12-seco-$\Delta^{1,4}$-pregnadiene-12,17α,21-triol-3,20-dione-11-oic (11-12)lactone.

4. 11,12 - secoallopregnane - 3β,12,17α,21 - tetrol - 20-one-11-oic (11-12)lactone-21-acetate.

5. 11,12 - secoallopregnane - 12,17α,21 - triol - 3,20-dione-11-oic (11-12)lactone-21-acetate.

6. 11,12 - seco - $\Delta^{16}$ - allopregnene - 3β,12 - diol - 20-one-11-oic (11-12)lactone-3β-acetate.

7. 16α,17α - oxido - 11,12 - secoallopregnane - 3β,12-diol-20-one-11-oic (11-12)lactone-3β-acetate.

8. 16β - bromo - 11,12 - secoallopregnane - 3β,12,17α-triol-20-one-11-oic (11-12)lactone-3β-acetate.

9. 11,12 - secoallopregnane - 3β,12,17α - triol - 20-one-11-oic (11-12)lactone-3β-acetate.

10. 11,12 - secoallopregnane - 3β,12,17α - triol - 20-one-11-oic (11-12)lactone.

11. 21 - bromo - 11,12 - secoallopregnane - 3β,12,17α-triol-20-one-11-oic (11-12)lactone.

References Cited in the file of this patent

UNITED STATES PATENTS 2,705,233    Julian _____ Mar. 29, 1955